US012716120B2

(12) United States Patent
Ichie et al.

(10) Patent No.: US 12,716,120 B2
(45) Date of Patent: Aug. 25, 2026

(54) HOT-ROLLED STEEL SHEET FOR NON-ORIENTED ELECTROMAGNETIC STEEL SHEETS

(71) Applicant: NIPPON STEEL CORPORATION, Tokyo (JP)

(72) Inventors: Takeru Ichie, Tokyo (JP); Yoshihiro Arita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1009 days.

(21) Appl. No.: 17/782,005

(22) PCT Filed: Feb. 19, 2021

(86) PCT No.: PCT/JP2021/006334
§ 371 (c)(1),
(2) Date: Jun. 2, 2022

(87) PCT Pub. No.: WO2021/167063
PCT Pub. Date: Aug. 26, 2021

(65) Prior Publication Data
US 2023/0013043 A1 Jan. 19, 2023

(30) Foreign Application Priority Data
Feb. 20, 2020 (JP) ................................. 2020-027497

(51) Int. Cl.

| | |
|---|---|
| ***C22C 38/06*** | (2006.01) |
| ***C21D 1/84*** | (2006.01) |
| ***C21D 6/00*** | (2006.01) |
| ***C21D 8/1216*** | (2026.01) |
| ***C21D 8/1244*** | (2026.01) |
| ***C21D 9/46*** | (2006.01) |
| ***C22C 38/02*** | (2006.01) |
| ***C22C 38/04*** | (2006.01) |
| ***H01F 1/147*** | (2006.01) |

(52) U.S. Cl.
CPC ................ *C22C 38/06* (2013.01); *C21D 1/84* (2013.01); *C21D 6/008* (2013.01); *C21D 8/1222* (2013.01); *C21D 8/1261* (2013.01); *C21D 9/46* (2013.01); *C22C 38/02* (2013.01); *C22C 38/04* (2013.01); *H01F 1/14775* (2013.01)

(58) Field of Classification Search
None
See application file for complete search history.

(56) References Cited

U.S. PATENT DOCUMENTS

| | | | | |
|---|---|---|---|---|
| 5,421,912 A * | 6/1995 | Kumano | .............. | C21D 8/1244 148/120 |
| 2011/0126944 A1 * | 6/2011 | Kami | ..................... | C21D 6/002 148/333 |
| 2014/0373340 A1 | 12/2014 | Dorninger et al. | | |
| 2017/0314090 A1 | 11/2017 | Okubo et al. | | |

FOREIGN PATENT DOCUMENTS

| | | | | |
|---|---|---|---|---|
| JP | 63-210237 A | 8/1988 | | |
| JP | 64-227 A | 1/1989 | | |
| JP | 03053022 A * | 3/1991 | | |
| JP | 08295935 A * | 11/1996 | | |
| JP | H11-043725 * | 2/1999 | ............... | C21D 8/02 |
| JP | 2000129409 A * | 5/2000 | | |
| JP | 2003183789 A * | 7/2003 | | |
| JP | 2016-211016 A | 12/2016 | | |
| JP | 2019-183228 A | 10/2019 | | |
| KR | 10-2017-0072278 A | 6/2017 | | |

OTHER PUBLICATIONS

Cahn and Haasen, eds. Physical Metallurgy. Fourth, revised and enhanced edition. Chapter 17 Physical Metallurgy of Steels. pp. 1555-1620. 1996. (Year: 1996).*
Campbell, ed. Metals Fabrication: Understand the Basics. Chapter 1: Primary Mill Fabrication. ASM International. 2013. pp. 1-45. (Year: 2013).*

* cited by examiner

*Primary Examiner* — Stephani Hill
(74) *Attorney, Agent, or Firm* — Birch, Stewart, Kolasch & Birch, LLP

(57) ABSTRACT

A hot-rolled steel sheet for non-oriented electrical steel sheets includes, by mass %: C: 0.0010% to 0.0050%; Si: 1.90% to 3.50%; Al: 0.10% to 3.00%; Mn: 0.05% to 2.00%; P: 0.100% or less; S: 0.005% or less; N: 0.0040% or less; B: 0.0060% or less; Sn: 0% to 0.50%; Sb: 0% to 0.50%; Cu: 0% to 0.50%; REM: 0% to 0.0400%; Ca: 0% to 0.0400%; Mg: 0% to 0.0400%; and a remainder including Fe and impurities, in which a hardness $H_D$ of a deformed structure of a thickness middle portion (½t position) in a sheet width direction end portion of the hot-rolled steel sheet for non-oriented electrical steel sheets is Hv 220 or less.

2 Claims, No Drawings

HOT-ROLLED STEEL SHEET FOR NON-ORIENTED ELECTROMAGNETIC STEEL SHEETS

TECHNICAL FIELD OF THE INVENTION

The present invention relates to a hot-rolled steel sheet for non-oriented electrical steel sheets having excellent magnetic characteristics that is mainly used for an iron core material of an electrical equipment.

Priority is claimed on Japanese Patent Application No. 2020-027497, filed on Feb. 20, 2020, the content of which is incorporated herein by reference.

RELATED ART

In the fields of electrical equipment, especially rotating machines, small and medium-sized transformers, electrical components, or the like, where a non-oriented electrical steel sheet is used as an iron core material, demand for higher efficiency and smaller size has been increasing under the influence of actions of global environment protection such as global power and energy saving or $CO_2$ emission reduction. In this social environment, improvement of performance is also an urgent issue for non-oriented electrical steel sheets.

Regarding improvement of characteristics of a motor, characteristics required for the non-oriented electrical steel sheet are iron loss and magnetic flux density. In the past, by recrystallization of 60% or more of a region during high temperature coiling of hot rolling, a texture of a product sheet is controlled to improve the characteristics thereof.

Patent Document 1 discloses that, by recrystallization and grain growth at a stage of a hot-rolled sheet, crystal grains and a texture are affected at a stage of a product after annealing to improve magnetic characteristics.

PRIOR ART DOCUMENT

Patent Document

[Patent Document 1] Japanese Unexamined Patent Application, First Publication No. S63-210237

DISCLOSURE OF THE INVENTION

Problems to be Solved by the Invention

As demand for the non-oriented electrical steel sheet (hereinafter, also simply referred to as "electrical steel sheet") increases, cost reduction is required. As a method of reducing the manufacturing cost, a method of skipping annealing after hot rolling by increasing a hot rolling temperature in the hot rolling process is considered. However, in a hot-rolled steel sheet in which the recrystallization ratio is increased, the toughness deteriorates. This deterioration in toughness initiates cracks from an end portion of the steel sheet to cause fracture in pickling process after hot rolling that accompanies bending and unbending on a continuous line. Simply when annealing after hot rolling is skipped, the toughness deteriorates to increase the risk that the steel sheet is fractured.

The present invention has been made under the above-described circumstances, and an object thereof is to provide a hot-rolled steel sheet for non-oriented electrical steel sheets in which, even when annealing after hot rolling is skipped, fracture caused by bending and unbending in subsequent pickling process can be suppressed, magnetic characteristics of an electrical steel sheet obtained from the hot-rolled steel sheet are excellent, and toughness is improved.

Means for Solving the Problem

The present inventors conducted a thorough investigation on a method which omits annealing in hot rolling process for a hot-rolled steel sheet for non-oriented electrical steel sheets and which simultaneously achieves hot-rolled sheet toughness sufficient for suppressing the fracture of a steel sheet end portion during pickling and magnetic characteristics in an electrical steel sheet.

As a result, the present inventors found that, by controlling a soaking temperature and a time during self-annealing of a hot-rolled sheet by high temperature coiling after hot rolling and a cooling rate, the area of a region of a deformed structure where a hardness in a thickness middle portion (½t portion) is Hv 220 or less can be increased. As a result, the present inventors found that, even when a recrystallization ratio is 60% or more and about 80% or less, the toughness of the hot-rolled steel sheet is improved, fracture caused by bending and unbending can be prevented, and excellent magnetic characteristics of a non-oriented electrical steel sheet obtained from the hot-rolled steel sheet can be achieved.

The present invention has been made based on the above findings, and the scope thereof is as follows.

(1) A hot-rolled steel sheet for non-oriented electrical steel sheets includes, by mass %: C: 0.0010% to 0.0050%; Si: 1.90% to 3.50%; Al: 0.10% to 3.00%; Mn: 0.05% to 2.00%; P: 0.100% or less; S: 0.005% or less; N: 0.0040% or less; B: 0.0060% or less; Sn: 0% to 0.50%; Sb: 0% to 0.50%; Cu: 0% to 0.50%; REM: 0% to 0.0400%; Ca: 0% to 0.0400%; Mg: 0% to 0.0400%; and a remainder including Fe and impurities, in which a hardness $H_D$ of a deformed structure of a thickness middle portion (½t position) in a sheet width direction end portion of the hot-rolled steel sheet for non-oriented electrical steel sheets is Hv 220 or less.

(2) In the hot-rolled steel sheet for non-oriented electrical steel sheets according to (1), a hardness difference $H_S=H_D-H_D$ between the hardness $H_D$ of the deformed structure and a hardness $H_U$ of a recrystallized structure of a thickness surface layer portion (⅛t position) in the sheet width direction end portion of the hot-rolled steel sheet for non-oriented electrical steel sheets is less than Hv 20.

(3) The hot-rolled steel sheet for non-oriented electrical steel sheets according to (1) or (2), further includes, by mass %, one or two or more selected from the group consisting of: Sn: 0.01% or more and 0.50% or less; Sb: 0.01% or more and 0.50% or less; Cu: 0.01% or more and 0.50% or less; REM: 0.0005% or more and 0.0400% or less; Ca: 0.0005% or more and 0.0400% or less; and Mg: 0.0005% or more and 0.0400% or less.

Effects of the Invention

According to the present invention, it is possible to provide a hot-rolled steel sheet for non-oriented electrical steel sheets in which sufficient hot-rolled sheet toughness can be obtained even when annealing in hot rolling process is omitted and low iron loss and high magnetic flux density can be achieved when a non-oriented electrical steel sheet is obtained from the hot-rolled steel sheet for non-oriented electrical steel sheets.

EMBODIMENTS OF THE INVENTION

Hereinafter, a hot-rolled steel sheet for non-oriented electrical steel sheets according to one aspect of the present invention will be described in detail.

The hot-rolled steel sheet for non-oriented electrical steel sheets is a material of a non-oriented electrical steel sheet, and hereinafter will also be simply referred to as "hot-rolled steel sheet". By performing cold rolling and final annealing on the hot-rolled steel sheet, a non-oriented electrical steel sheet can be obtained. Mechanical properties and a metallographic structure of the non-oriented electrical steel sheet having undergone the above-described processes are totally different from those of the hot-rolled steel sheet. In general, the non-oriented electrical steel sheet is softer than the hot-rolled steel sheet. The reason for this is that the recrystallized structure is softer than the deformed structure and the amount of the recrystallized structure in the non-oriented electrical steel sheet increases due to final annealing.

The deformed structure of the hot-rolled steel sheet according to the embodiment refers to a structure that is stretched by hot rolling. In addition, the recrystallized structure of the hot-rolled steel sheet according to the embodiment refers to a structure that is temporarily stretched by hot rolling and is recrystallized by self-annealing. The deformed structure and the recrystallized structure can be easily distinguished from each other by those skilled in the art. For example, in "Change (Recovery→Recrystallization→Grain Growth) in Structure and Properties by Annealing of Cold-Worked Material" in FIGS. 2 and 22, page 30, "Microstructure control of Iron Steel" (Tadashi Maki, 2015, Uchida Rokakuho Publishing Co., Ltd.), a visual difference between the deformed structure and the recrystallized structure is schematically described. Although the hot-rolled steel sheet according to the embodiment is not a cold-worked material, the deformed structure and the recrystallized structure in the hot-rolled steel sheet according to the embodiment have the same aspect as the deformed structure and the recrystallized structure described in the above document.

In addition, one object of the hot-rolled steel sheet according to the embodiment is to exhibit excellent magnetic characteristics at a stage of an electrical steel sheet having undergone the above-described processes. However, it is not necessary to consider magnetic characteristics of the hot-rolled steel sheet. Hereinafter, in the description of the hot-rolled steel sheet according to the embodiment, magnetic characteristics refers to not magnetic characteristics of the hot-rolled steel sheet but magnetic characteristics of the non-oriented electrical steel sheet obtained by performing the above-described processes on the hot-rolled steel sheet.

[Chemical Composition of Hot-Rolled Steel Sheet for Non-Oriented Electrical Steel Sheets]

First, the reason for limiting the components of the hot-rolled steel sheet for non-oriented electrical steel sheets according to the embodiment will be described. Hereinafter, "%" regarding the components of the hot-rolled steel sheet represents "mass %".

C: 0.0010% to 0.0050%

C segregates in a grain boundary to strengthen toughness. Therefore, the C content is preferably 0.0010% or more. On the other hand, C is a harmful component that deteriorates iron loss and causes magnetic aging. Therefore, the C content is 0.0050% or less. The C content is more preferably 0.0015% or more, 0.0020% or more, or 0.0025% or more. The C content is preferably 0.0040% or less, 0.0035% or less, or 0.0030% or less.

Si: 1.90% to 3.50%

Si is a component that has an action of reducing iron loss by increasing electric resistance to decrease eddy-current loss. In addition, Si also has an action of improving workability at blanking to obtain an iron core by increasing a yield ratio. In order to exhibit these actions, the Si content needs to be 1.90% or more. On the other hand, when the Si content increases, the magnetic flux density decreases, and the workability of cold rolling or the like decreases and the cost increases in a manufacturing process of the non-oriented electrical steel sheet. Therefore, the Si content is set to be 3.50% or less. The Si content is more preferably 2.00% or more, 2.20% or more, or 2.50% or more. The Si content is preferably 3.20% or less, 3.00% or less, or 2.80% or less.

Al: 0.10% to 3.00%

As in Si, Al is also a component that has an action of reducing iron loss by increasing electric resistance to decrease eddy-current loss. However, an increase in hardness by Al is less than that of Si. Therefore, the Al content needs to be 0.10% or more. On the other hand, when the Al content increases, the saturated magnetic flux density decreases, which leads to a decrease in magnetic flux density. Further, the yield ratio decreases, and the blanking accuracy also deteriorates. Therefore, the Al content is set to be 3.00% or less. The Al content is set to be preferably 2.50% or less.

Mn: 0.05% to 2.00%

Mn has an effect of increasing electric resistance to decrease eddy-current loss and improving a primary recrystallization texture to develop {110}<001> crystal orientation that is desirable for improvement of rolling direction magnetic characteristics. Further, Mn has an effect of decreasing the solubility of MnS in a slab. As a result, the amount of MnS dissolved during slab heating decreases, and the amount of fine MnS precipitated again during slab cooling decreases. That is, the precipitation of fine sulfides such as MnS that is harmful for grain growth is suppressed due to addition of Mn.

In order to obtain these objects, 0.05% or more of Mn needs to be included. However, when the Mn content increases, grain growth during annealing decreases, and iron loss increases. Therefore, the Mn content is set to be 2.00% or less. The Mn content is preferably 0.20% or more, 0.40% or more, or 0.80% or more. The Mn content is preferably 1.50% or less, 1.20% or less, or 1.00% or less.

P: 0.100% or Less

P has an effect of improving blanking accuracy and may be included in the hot-rolled steel sheet. However, when the P content increases, a steel sheet including 2% or more of Si is extremely brittle. Therefore, the P content is 0.100% or less and preferably 0.10% or less, 0.080% or less, 0.05% or less, 0.050% or less, or 0.030% or less. The P content may be 0%. For example, in order to avoid an increase in refining cost, the P content may be 0.001% or more, 0.002% or more, or 0.003% or more.

S: 0.005% or Less

S inhibits recrystallization and grain growth during final annealing by precipitation of fine sulfides such as MnS. Therefore, the S content is 0.005% or less and preferably 0.004% or less, 0.003% or less, or 0.002% or less. The S content may be 0%. For example, in order to avoid an increase in refining cost, the S content may be 0.0001% or more, 0.0002% or more, or 0.0003% or more.

N: 0.0040% or Less

N decreases the coverage of an internally oxidized layer on the hot-rolled sheet surface by precipitation of fine nitrides such as AlN that is formed during hot-rolled sheet annealing or during final annealing, and inhibits recrystallization and grain growth during final annealing. Therefore, the N content is 0.0040% or less and preferably 0.0030% or less, 0.0020% or less, or 0.0010% or less. The N content may be 0%. For example, in order to avoid an increase in refining cost, the N content may be 0.0001% or more, 0.0002% or more, or 0.0003% or more.

B: 0.0060% or Less

B inhibits recrystallization and grain growth during final annealing by precipitation of fine nitrides such as BN. Therefore, the B content is 0.0060% or less and preferably 0.0040% or less, 0.0030% or less, or 0.0020% or less. The B content may be 0%. For example, in order to avoid an increase in refining cost, the B content may be 0.0001% or more, 0.0002% or more, or 0.0003% or more.

Sn: 0% to 0.50%

Sb: 0% to 0.50%

Sn and Sb are not essential elements and have an effect of improving a primary recrystallization texture of the steel sheet to develop a {110}<001> texture that is desirable for improvement of rolling direction magnetic characteristics and suppressing a {111}<112> texture or the like that is not desirable for magnetic characteristics. Therefore, Sn and Sb may be optionally included in the hot-rolled steel sheet. In order to obtain these objects, it is preferable that either or both of 0.01% or more of Sn and Sb are included. On the other hand, even when the Sn content and the Sb content increase, the action is saturated, and the toughness of the hot-rolled sheet may rather decrease. Therefore, even when Sn and Sb are included, each of the Sn content and the Sb content is set to be 0.50% or less. Each of the lower limit of the Sn content and the lower limit of the Sb content may be 0.02%, 0.03%, or 0.05%. Each of the upper limit of the Sn content and the upper limit of the Sb content may be 0.45%, 0.40%, or 0.20%.

Cu: 0% to 0.50%

Cu is not an essential element and has an action of improving the strength when precipitated in the steel. Therefore, Cu may be optionally included in the hot-rolled steel sheet. In order to obtain this action, it is preferable that 0.01% or more of Cu is included. On the other hand, when more than 0.50% of Cu is included, cracks and defects may occur during rolling. Accordingly, the Cu content is preferably 0.50% or less. The Cu content may be 0.02% or more, 0.03% or more, or 0.05% or more. The Cu content may be 0.40% or less, 0.30% or less, or 0.20% or less.

REM: 0% to 0.0400%

Ca: 0% to 0.0400%

Mg: 0% to 0.0400%

Although they are not essential elements, REM, Ca, and Mg are elements that promote grain growth and may be optionally included in the hot-rolled steel sheet. In order to obtain this effect, the amount of each of one or more elements selected from the group consisting of REM, Ca, and Mg is preferably 0.0005% or more, more preferably 0.0010% or more, and still more preferably 0.0050% or more or 0.0100% or more. On the other hand, when the amount of each of REM, Ca, and Mg is more than 0.0400%, magnetic characteristics deteriorate. Therefore, the amount of each of REM, Ca, and Mg is set to be 0.0040% or less. The amount of each of the elements is preferably 0.0300% or less and more preferably 0.0200% or less or 0.0150% or less.

The term "REM" refers to 17 elements in total including Sc, Y, and lanthanoids, and "REM content" refers to the total amount of these 17 elements. When the lanthanoids are used as REM, REM is added industrially in the form of mischmetal.

The remainder in the components of the hot-rolled steel sheet according to the embodiment other than the above-described components include Fe and impurity elements. Here, the impurities refer to elements which are, when the steel is industrially manufactured, incorporated from raw materials such as ore or scrap or incorporated by various factors of the manufacturing process, and the impurities are allowed to be included in the steel in a range not adversely affecting the characteristics of the hot-rolled steel sheet according to the embodiment.

By the hot-rolled steel sheet including the above-described components, when an electrical steel sheet is obtained from the hot-rolled steel sheet, a non-oriented electrical steel sheet having excellent magnetic characteristics can be obtained.

<Hardness of Deformed Structure of Hot-Rolled Sheet>

Next, the hot-rolled steel sheet according to the embodiment has a characteristic in that a hardness $H_D$ of a deformed structure of a thickness middle portion (½t position) is Hv 220 or less. Here, "t" represents a sheet thickness.

When the hardness $H_D$ of the deformed structure of the thickness middle portion (½t position) of the hot-rolled steel sheet is more than Hv 220, a recrystallization driving force of {111} grains having poor magnetic characteristics that appear during annealing after cold-rolling the deformed structure increases. Therefore, the magnetic characteristics of the non-oriented electrical steel sheet deteriorate. When the hardness $H_D$ of the deformed structure is Hv 220 or less, the recrystallization driving force of the {111} grains is the same as that of {110} grains that improve magnetic characteristics. Therefore, the magnetic characteristics do not deteriorate. Therefore, the hardness $H_D$ of the deformed structure of the thickness middle portion (½t position) of the hot-rolled steel sheet is desirably Hv 220 or less. The hardness $H_D$ of the deformed structure of the thickness middle portion (½t position) of the hot-rolled steel sheet is more desirably Hv 215 or less, Hv 210 or less, or Hv 200 or less.

In general, the deformed structure is harder than the recrystallized structure. When the proportion of the deformed structure in the hot-rolled sheet is high, the hardness of the hot-rolled sheet is high. When the hot-rolled sheet having a high hardness is cold-rolled, the alignment degree of {211}<011> of the cold-rolled sheet increases. The alignment degree of {111} orientation that appears from a portion having a high alignment degree of {211}<011> due to annealing is improved. Therefore, magnetic characteristics deteriorate. In the related art, in order to suppress deterioration in magnetic characteristics, the hot-rolled sheet is annealed such that the area of the deformed structure of the hot-rolled sheet is as small as possible, the recrystallization region of the hot-rolled sheet increases to be about 80% or more, and subsequently the steel sheet is cold-rolled and annealed. However, the recrystallized structure is softer than the deformed structure, but the amount of dislocation affecting toughness is small. Therefore, when the recrystallization region increases to be about 80% or more, the toughness of the hot-rolled steel sheet deteriorates, and the possibility of fracture of the steel sheet caused by bending and unbending on the next pickling and cold rolling line increases. Accordingly, in order to improve the toughness of the hot-rolled steel sheet and to improve the magnetic characteristics of the non-oriented electrical steel sheet obtained from the hot-rolled steel sheet, by suppressing the recrystallization of the hot-rolled steel sheet as far as possible (for example, by setting the recrystallization ratio of the hot-rolled steel sheet to be about 60% or more and about 80% or less), the deformed structure remains in the hot-rolled steel sheet, and the hardness $H_D$ of the deformed structure of the thickness middle portion (½t position) is desirably Hv 220 or less. That is, in the hot-rolled steel sheet according to the embodiment, by softening the deformed structure while maintaining the amount of the deformed structure to be a predetermined value or more, the hardness of the hot-rolled steel sheet is reduced.

The Vickers hardness is measured in a cross section parallel to a rolling direction and perpendicular to a sheet surface in a position (hereinafter, referred to as "sheet width direction end portion") at a distance of 10 mm from a sheet width direction end surface of the hot-rolled steel sheet to a sheet width direction middle portion. In this cross section, the hardness $H_D$ of the deformed structure of the thickness middle portion (½t position) and a hardness $H_D$ of a recrystallized structure of a thickness surface layer portion (⅛t position) are measured at 10 positions at intervals of 10 μm in a direction parallel to the rolling direction. The Vickers hardness is measured according to JIS Z 2244 (2009). Specific measurement conditions are as follows.

Indenter=a Vickers square-based diamond pyramid indenter with a facing angle of 136°

Indentation load=10 gf

Indentation time=20 sec

In addition, in the sheet width direction end portion of the hot-rolled steel sheet for non-oriented electrical steel sheets, the hardness difference $H_S=H_D-H_U$ between the hardness $H_D$ of the deformed structure of the thickness middle portion (½t position) and the hardness $H_U$ of the recrystallized structure of a thickness surface layer portion (⅛t position) is set to be less than Hv 20 such that magnetic characteristics can be further improved. The reason for this is as follows. As Hv of the hot-rolled sheet increases, recrystallization can be made to easily occur during annealing after cold rolling. On the other hand, by reducing the hardness difference between the middle portion and the surface layer portion of the hot-rolled sheet, the recrystallized structure, which appears in the surface layer portion of the steel sheet after cold rolling and annealing and which is advantageous for magnetic characteristics, is not likely to be affected by the recrystallized structure, which appears in the middle portion of the steel sheet and which is disadvantageous for magnetic characteristics. The hardness $H_U$ of the recrystallized structure of the thickness surface layer portion (⅛t position) can be measured using the same method as that of the hardness $H_D$ of the deformed structure of the thickness middle portion (½t position).

In the hot-rolled steel sheet, typically, the surface layer is harder than the middle portion. In the hot-rolled steel sheet, the amount of the recrystallized structure in the surface layer is more than that in the middle portion. In consideration of the above-described circumstances, in the hot-rolled steel sheet according to the embodiment, the hardness of the middle portion that is presumed to be the hardest is controlled to be a predetermined value or less. On the other hand, in the non-oriented electrical steel sheet obtained by performing cold rolling and final annealing on the hot-rolled steel sheet, typically, the hardness difference between the surface layer and the middle portion is small or is not substantially present.

[Manufacturing Method]

Next, a method of manufacturing the hot-rolled steel sheet for non-oriented electrical steel sheets according to the embodiment will be described. The method of manufacturing the hot-rolled steel sheet for non-oriented electrical steel sheets according to the embodiment includes:

a process of obtaining a slab by continuously casting molten steel including the above-described components;

a process of heating the slab to a temperature range of 1080° C. to 1200° C.;

a process of obtaining a hot-rolled sheet by hot-rolling the slab in the temperature range of 1080° C. to 1200° C., in which a finishing temperature is 850° C. to 1000° C.;

a process of coiling the hot-rolled sheet, in which a coiling temperature is 700° C. to 850° C.;

a process of causing self-annealing in the hot-rolled sheet in which a heat conservation temperature is 670° C. or higher and a retention time is 1 minute or longer and 2 hours or shorter; and a process of cooling the hot-rolled sheet where self-annealing occurs, in which CR1, which an average cooling rate from a temperature at coiling after hot rolling to 400° C., and/or CR2, which is an average cooling rate in a temperature range of 600° C. to 400° C. after self-annealing, are 30 to 120° C./hr.

The hot-rolled steel sheet for non-oriented electrical steel sheets according to the embodiment is manufactured using the method including: continuously casting molten steel including the above-described components to obtain a slab; hot-rolling the slab to obtain a hot-rolled sheet; and causing self-annealing to occur using heat of a coil coiled after hot rolling. A method of manufacturing the slab may be a routine method.

<Hot Rolling>

Next, the slab is heated to preferably 1080° C. to 1200° C. and is hot rolled. The reason for setting the heating temperature to be 1080° C. or higher is that, by setting the finishing temperature to be 850° C. or higher, annealing performed by reheating after coiling is omitted as described below. The reason that the heating temperature is preferably 1200° C. or lower is to prevent solid solution and fine precipitation of impurities such as sulfides to prevent an increase in iron loss.

The finishing temperature in the hot rolling is set to be preferably 850° C. to 1000° C. The reason for this is as follows. As described below, when the coiling temperature is set to be 700° C. to 850° C. so that self-annealing is performed using heat of the coil, the recrystallization ratio increases, and annealing performed by reheating is omitted. In addition, when the finishing temperature is low, hot workability may deteriorate and uniformity of sheet thickness in the sheet width direction, that is, sheet thickness accuracy may deteriorate. On the other hand, in order to prevent toughness from deterioration caused by an increase in ferrite grain size, the finishing temperature is set to be preferably 1000° C. or lower.

<Coiling and Self-Annealing>

Next, the hot-rolled steel sheet is coiled at 700° C. to 850° C. after the end of finish rolling. By coiling at 700° C. to 850° C., self-annealing can be performed using heat stored in the coiled coil. According to this self-annealing, the recrystallization ratio in the hot-rolled steel sheet increases, and, even if annealing performed by reheating is omitted, the growth of crystal grains of {111} orientation having an adverse effect on magnetic characteristics can be suppressed. In order to improve magnetic characteristics, in particular, magnetic flux density, it is preferable that the recrystallization region in the structure of the hot-rolled steel sheet before cold rolling increases. When the annealing temperature is high, the recrystallization ratio increases to be more than 60%, the deformed structure decreases, and the effect of improving toughness cannot be obtained. Therefore, the coiling temperature is set to be preferably 850° C. or lower.

<Heat Conservation Treatment Process>

In order to increase the grain size of the hot-rolled steel sheet before cold rolling, the coiled coil is covered with a heat conservation cover for heat conservation. From the viewpoint of decreasing the hardness of the deformed structure of the hot-rolled sheet, the heat conservation temperature is set to be 670° C. or higher, and the retention time is set to be 1 minute or longer. On the other hand, when the recrystallization ratio is excessively high, fracture is likely to occur in pickling process and cold rolling process. Therefore, the retention time is set to be preferably 2 hours or shorter. The retention time refers to a period of time for which the coil is covered with the heat conservation cover.

Heat conservation process may be executed without using the heat conservation cover. In this case, the heat conservation process refers to a period from the time when the hot-rolled steel sheet is coiled to form a coil to the time when the temperature of the coil starts to decrease. The time when the coil is formed refers to the time when one turn of the coil is completely coiled from one hot-rolled steel sheet strip. In addition, the time when the temperature of the coil starts to decrease is the time when the cooling rate of the coil changes, in other words, an inflection point on a cooling rate curve. Depending on the heat conservation temperature, during a predetermined time from the time when the coil is completely coiled, a temperature change of the coil may be extremely small. After the predetermined time is elapsed, the temperature of the coil starts to decrease rapidly.

<Cooling>

In the embodiment, in order to decrease the hardness of the deformed structure, it is important to control the cooling rate. Specifically, it is preferable that CR1, which is an average cooling rate from a temperature at coiling after hot rolling to 400° C., and/or CR2, which is an average cooling rate in a temperature range of 600° C. to 400° C. after the retention in heat conservation process, is 30 to 120° C./hr.

Here, "CR1, which is an average cooling rate from a temperature at coiling after hot rolling to 400° C." refers to an average value of cooling rate during a period from the coiling to the start of heat conservation and a period from the end of heat conservation to a time at which the temperature of coil becomes 400° C. In other words, "CR1, which is an average cooling rate from a temperature at coiling after hot rolling to 400° C." is a value calculated from the following expression.

CR1=(Coiling Temperature−400° C.)/(Time from Coiling Temperature to 400° C.−Time for which Coil is covered with Heat Conservation Cover)

In addition, "CR2, which is an average cooling rate in a temperature range of 600° C. to 400° C. after the retention in heat conservation process" refers to an average value of cooling rate during a period from a time at which the temperature of the coil is 600° C. to a time at which the temperature of coil becomes 400° C. In other words, "CR2, which is an average cooling rate in a temperature range of 600° C. to 400° C. after the retention in the heat conservation process" refers to a value calculated from the following expression.

CR2=(600° C.−400° C.)/(Time from 600° C. to 400° C.)

It is preferable that cooling after the retention in the heat conservation process starts immediately after removing the above-described cover. Alternatively, it is preferable that cooling process starts before the time when the temperature of the coil starts to decrease.

The average cooling rate that is applied to the manufacturing of the hot-rolled steel sheet according to the embodiment is much slower than the usual cooling rate. Usually, the coiled coil is water-cooled, and the average cooling rate thereof is much faster than 120° C./hr. It is presumed that, when the coil is water-cooled, the average cooling rate is at least 150° C./hr. The reason why the coil is water-cooled is that the period of time required for the manufacturing of the non-oriented electrical steel sheet is reduced. In order to cold-roll the hot-rolled steel sheet, the temperature of the hot-rolled steel sheet needs to be room temperature. Unless the hot-rolled steel sheet is rapidly cooled using a cooling unit such as water cooling, the waiting time required for the start of cold rolling increases, and the time required for the manufacturing of the non-oriented electrical steel sheet increases. Unless there is a specific reason, typically, it is preferable that the coil is water-cooled. In addition, in the hot-rolled steel sheet for non-oriented electrical steel sheets, the knowledge that the hardness of the deformed structure should be reduced is not present in the related art.

However, the present inventors found that, in order to reduce the hardness of the deformed structure of the hot-rolled steel sheet, the coil after the heat conservation needs to be slowly cooled. When the average cooling rate CR1 or CR2 is excessively fast, the hardness of the deformed structure cannot be sufficiently reduced. In addition, when the average cooling rate is excessively slow, the time of self-annealing increases, the deformed structure is lost, and the toughness deteriorates. Accordingly, the average cooling rate CR1 and/or CR2 is 30° C./hr or faster and 120° C./hr or slower.

The cooling after heat conservation is performed in a state where the steel sheet is coiled to form a coil. The above-described cooling rate is a rate in the outer circumferential portion of the coil. In addition, as described above, a portion where cracks initiate to cause fracture in the steel sheet is an end portion of the steel sheet. The above-described cooling rate is a rate in the end portion of the steel sheet (that is, both end portions of the coil in the core direction of the coil).

Further, among CR1 and CR2 described above, the average cooling rate CR1 from the coiling temperature to 400° C. can be controlled to be more preferable. By controlling CR1 to be 50 to 80° C./hr, in the end portion of the hot-rolled steel sheet for non-oriented electrical steel sheets, the hardness difference $H_S=H_D-H_U$ between the hardness $H_D$ of the deformed structure and the hardness $H_U$ of the recrystallized structure of the thickness surface layer portion (⅛t position) can be adjusted to be Hv 20 or less. As a result, the toughness of the hot-rolled steel sheet can be further improved.

<Sn, Sb>

When Sn and Sb are added to the steel sheet, these elements contribute to low iron loss and high magnetic flux density. Therefore, the heat conservation temperature can be reduced, and thus the toughness can be improved. At this time, by setting the temperature of heat conservation to be 850° C. or lower, preferably 800° C. or lower, and more preferably 750° C. or lower, appropriate toughness, low iron loss, and high magnetic flux density can be achieved at a high level.

The mechanism in which the addition of Sn and Sb contributes to low iron loss and high magnetic flux density is presumed to be that these elements suppress the growth of {111} orientation grains having an adverse effect on magnetic characteristics.

By performing pickling, cold rolling, and final annealing using a routine method on the hot-rolled steel sheet for non-oriented electrical steel sheets according to the embodiment obtained as described above, a non-oriented electrical steel sheet having excellent magnetic characteristics can be obtained. At this time, as described above, the hot-rolled steel sheet for non-oriented electrical steel sheets according to the embodiment has excellent toughcoatness. Even when pickling is performed using a typical method, cracking caused by bending and unbending does not occur.

EXAMPLES

Next, examples of the present invention will be described. However, conditions of the examples are merely exemplary to confirm the operability and the effects of the present invention, and the present invention is not limited to these condition examples. The present invention can adopt various conditions within a range not departing from the scope of the present invention as long as the object of the present invention can be achieved under the conditions.

Example 1

The steel including the components shown in Table 1 was cast and hot-rolled to prepare a hot-rolled sheet having a sheet thickness of 2.0 mm Next, under conditions shown in Table 2, it was coiled, heat-conservated, and cooled. Manufacturing No. BO is a reference example in which hot-rolled sheet annealing was performed in an atmosphere of nitrogen 100% after coiling and cooling. Table 3 shows the measurement result of a fracture appearance transition temperature in a Charpy test that was performed in order to evaluate the hardness and the toughness of the deformed structure in the end portion of the prepared hot-rolled sheet.

In order to obtain the hardness of the steel sheet end portion, in a cross section parallel to a rolling direction in a position (sheet width direction end portion) at a distance of 10 mm from a sheet width direction end surface of the steel sheet to a sheet width direction middle portion, the hardness $H_D$ of the deformed structure of the thickness middle portion (½t position) and the hardness $H_U$ of the recrystallized structure of the thickness surface layer portion (⅛t position) were measured at 10 positions at intervals of 10 μm in a direction parallel to the rolling direction. The Vickers hardness was measured as "HV 10" according to JIS Z 2244 (2009). Specific measurement conditions are as follows: Indenter=a Vickers square-based diamond pyramid indenter with a facing angle of 136°; Indentation load=10 gf; and Indentation time=20 sec.

The fracture appearance transition temperature was measured by performing the Charpy test according to JIS Z 2242. In Examples, when the fracture appearance transition temperature was lower than 0° C., the toughness was determined to be excellent.

In addition, the magnetic characteristics of the obtained non-oriented electrical steel sheet was measured according to JIS C 2556.

The iron loss was evaluated by collecting a sample having a size of 55 square mm from the non-oriented electrical steel sheet and measuring W15/50 (iron loss when the steel sheet was magnetized at 50 Hz at a magnetic flux density of 1.5 T) using a single sheet tester (SST). The magnetic flux density was evaluated using B50 as a magnetic flux density at a field intensity of 5000 A/m. Table 3 also shows the measurement result. A sample where B50 was 1.60 or more and W15/50 was 2.6 W/kg or less was determined as "Pass" regarding electromagnetic characteristics.

TABLE 1

| | Chemical composition (mass %) | | | | | | | | | | | | | |
|---|---|---|---|---|---|---|---|---|---|---|---|---|---|---|
| Steel No. | C | Si | Mn | P | S | Al | N | B | Sn | Sb | Cu | REM | Ca | Mg |
| A1 | 0.0011 | 3.00 | 0.31 | 0.011 | 0.004 | 0.31 | 0.0023 | 0.0045 | — | — | — | — | — | — |
| A2 | 0.0048 | 2.64 | 0.23 | 0.013 | 0.003 | 0.82 | 0.0022 | 0.0024 | — | — | — | — | — | — |
| A3 | 0.0015 | 1.90 | 0.19 | 0.016 | 0.003 | 1.76 | 0.0024 | 0.0034 | — | — | — | — | — | — |
| A4 | 0.0016 | 3.29 | 0.06 | 0.018 | 0.004 | 0.12 | 0.0023 | 0.0051 | — | — | — | — | — | — |
| A5 | 0.0024 | 3.12 | 0.05 | 0.022 | 0.002 | 0.34 | 0.0018 | 0.0044 | — | — | — | — | — | — |
| A6 | 0.0034 | 2.16 | 1.99 | 0.019 | 0.004 | 0.25 | 0.0016 | 0.0028 | — | — | — | — | — | — |
| A7 | 0.0034 | 2.23 | 1.56 | 0.095 | 0.002 | 0.45 | 0.0026 | 0.0031 | — | — | — | — | — | — |
| A8 | 0.0025 | 2.72 | 0.98 | 0.045 | 0.005 | 0.22 | 0.0018 | 0.0023 | — | — | — | — | — | — |
| A9 | 0.0043 | 3.09 | 0.45 | 0.056 | 0.004 | 0.11 | 0.0022 | 0.0031 | — | — | — | — | — | — |
| A10 | 0.0026 | 1.91 | 0.06 | 0.028 | 0.002 | 2.95 | 0.0023 | 0.0032 | — | — | — | — | — | — |
| A11 | 0.0037 | 3.02 | 0.23 | 0.033 | 0.004 | 0.34 | 0.0039 | 0.0025 | — | — | — | — | — | — |
| A12 | 0.0023 | 1.98 | 0.67 | 0.023 | 0.004 | 1.34 | 0.0022 | 0.0058 | — | — | — | — | — | — |
| A13 | 0.0019 | 2.95 | 0.20 | 0.019 | 0.001 | 0.45 | 0.0021 | 0.0035 | — | — | — | — | — | — |
| A14 | 0.0022 | 2.21 | 0.24 | 0.028 | 0.002 | 1.34 | 0.0023 | 0.0028 | — | — | — | — | — | — |
| A15 | 0.0023 | 2.31 | 0.23 | 0.012 | 0.004 | 1.22 | 0.0024 | 0.0034 | 0.02 | — | — | — | — | — |
| A16 | 0.0022 | 2.03 | 0.27 | 0.015 | 0.008 | 1.55 | 0.0017 | 0.0031 | — | 0.01 | — | — | — | — |
| A17 | 0.0025 | 2.01 | 0.29 | 0.023 | 0.003 | 1.56 | 0.0019 | 0.0029 | — | — | 0.02 | — | — | — |
| A18 | 0.0026 | 2.16 | 0.33 | 0.021 | 0.008 | 1.34 | 0.0026 | 0.0045 | 0.01 | — | 0.03 | — | — | — |
| A19 | 0.0021 | 2.10 | 0.61 | 0.026 | 0.005 | 1.23 | 0.0022 | 0.0037 | — | — | — | 0.0009 | — | — |
| A20 | 0.0014 | 2.15 | 1.01 | 0.018 | 0.006 | 0.91 | 0.0031 | 0.0029 | — | — | — | — | 0.0011 | — |
| A21 | 0.0031 | 2.01 | 0.81 | 0.019 | 0.004 | 1.21 | 0.0024 | 0.0022 | — | — | — | — | — | 0.0024 |
| a1 | 0.0002 | 2.51 | 0.23 | 0.047 | 0.003 | 0.98 | 0.0023 | 0.0034 | 0.09 | — | — | — | — | — |
| a2 | 0.0087 | 2.52 | 0.67 | 0.048 | 0.002 | 0.67 | 0.0025 | 0.0038 | — | 0.17 | — | — | — | — |
| a3 | 0.0034 | 1.24 | 0.45 | 0.019 | 0.002 | 2.41 | 0.0033 | 0.0024 | — | — | 0.07 | — | — | — |
| a4 | 0.0022 | 4.20 | 0.07 | 0.018 | 0.003 | 0.12 | 0.0022 | 0.0028 | 0.07 | 0.07 | 0.07 | — | — | — |
| a5 | 0.0028 | 2.63 | 0.01 | 0.026 | 0.002 | 0.97 | 0.0026 | 0.0026 | — | — | — | 0.0100 | — | — |
| a6 | 0.0036 | 1.93 | 3.45 | 0.022 | 0.003 | 0.12 | 0.0031 | 0.0035 | — | — | — | — | 0.0400 | — |
| a7 | 0.0021 | 2.19 | 0.12 | 0.232 | 0.002 | 1.45 | 0.0026 | 0.0031 | — | — | — | — | — | 0.0300 |
| a8 | 0.0028 | 2.25 | 0.34 | 0.098 | 0.011 | 1.23 | 0.0028 | 0.0045 | — | — | — | — | — | — |
| a9 | 0.0033 | 2.99 | 0.78 | 0.034 | 0.004 | 0.02 | 0.0021 | 0.0042 | — | — | — | — | — | — |
| a10 | 0.0025 | 1.92 | 0.13 | 0.033 | 0.005 | 3.22 | 0.0031 | 0.0043 | — | — | — | — | — | — |

TABLE 1-continued

| Steel No. | Chemical composition (mass %) C | Si | Mn | P | S | Al | N | B | Sn | Sb | Cu | REM | Ca | Mg |
|---|---|---|---|---|---|---|---|---|---|---|---|---|---|---|
| a11 | 0.0038 | 2.07 | 0.67 | 0.016 | 0.002 | 1.23 | 0.0053 | 0.0049 | — | — | — | — | — | — |
| a12 | 0.0039 | 2.20 | 0.26 | 0.038 | 0.003 | 1.34 | 0.0011 | 0.0089 | — | — | — | — | — | — |

TABLE 2

| Manufacturing method symbol | Hot rolling process Slab heating temperature (° C.) | Hot rolling process Finish temperature (° C.) | Hot rolling process Coiling temperature (° C.) | From coiling 400° C. Average cooling rate CR1 (° C./h) | Hot-rolled sheet annealing process Annealing temperature (° C.) | Heat conservation process Heat conservation temperature (° C.) | Heat conservation process Heat conservation time (min) | After heat conservation process From 600° C. to 400° C. Average cooling rate CR2 (° C./h) |
|---|---|---|---|---|---|---|---|---|
| B0 | 1160 | 860 | 668 | 340 | 880 | — | — | — |
| B1 | 1082 | 934 | 810 | 72 | — | 750 | 15 | 45 |
| B2 | 1190 | 923 | 820 | 69 | — | 740 | 18 | 63 |
| B3 | 1138 | 853 | 720 | 87 | — | 680 | 19 | 34 |
| B4 | 1179 | 998 | 738 | 84 | — | 740 | 67 | 67 |
| B5 | 1123 | 913 | 740 | 83 | — | 740 | 1 | 82 |
| B6 | 1123 | 897 | 729 | 92 | — | 710 | 117 | 81 |
| B7 | 1090 | 880 | 723 | 103 | — | 720 | 78 | 34 |
| B8 | 1120 | 915 | 740 | 105 | — | 730 | 72 | 118 |
| B9 | 1134 | 950 | 840 | 57 | — | 780 | 50 | 93 |
| B10 | 1123 | 940 | 820 | 51 | — | 780 | 74 | 81 |
| b1 | 980 | 923 | 774 | 89 | — | 720 | 45 | 102 |
| b2 | 1340 | 890 | 780 | 83 | — | 740 | 65 | 56 |
| b3 | 1134 | 789 | 710 | 102 | — | 650 | 39 | 78 |
| b4 | 1189 | 1090 | 736 | 98 | — | 720 | 57 | 74 |
| b5 | 1164 | 910 | 811 | 91 | — | 740 | 0.4 | 102 |
| b6 | 1138 | 923 | 802 | 97 | — | 755 | 140 | 98 |
| b7 | 1142 | 915 | 788 | 130 | — | 770 | 82 | 130 |
| b8 | 1142 | 915 | 788 | 20 | — | 770 | 82 | 20 |

TABLE 3

| | Symbol | Steel No. | Manufacturing method symbol | 1/2t position0048 Hardness $H_D$ of deformed structure (Hv) | Recrystallization ratio % | Hot-rolled sheet toughness Charpy test transition temperature (° C.) | Magnetic flux density B50 (T) | Iron loss W15/50 (W/kg) |
|---|---|---|---|---|---|---|---|---|
| Reference example | C0 | A6 | B0 | 250 | 85 | 12 | 1.62 | 2.71 |
| Inventive Example | C1 | A1 | B1 | 203 | 75 | −3 | 1.66 | 2.52 |
| | C2 | A2 | B2 | 204 | 72 | −6 | 1.66 | 2.53 |
| | C3 | A3 | B3 | 201 | 80 | −4 | 1.67 | 2.52 |
| | C4 | A4 | B4 | 205 | 72 | −5 | 1.68 | 2.54 |
| | C5 | A5 | B5 | 203 | 60 | −6 | 1.68 | 2.51 |
| | C6 | A6 | B6 | 199 | 60 | −1 | 1.67 | 2.57 |
| | C7 | A7 | B7 | 197 | 69 | −9 | 1.65 | 2.51 |
| | C8 | A8 | B8 | 208 | 71 | −8 | 1.68 | 2.49 |
| | C9 | A9 | B9 | 203 | 74 | −9 | 1.67 | 2.53 |
| | C10 | A10 | B10 | 205 | 73 | −9 | 1.66 | 2.53 |
| | C11 | A11 | B1 | 207 | 65 | −6 | 1.66 | 2.54 |
| | C12 | A12 | B2 | 200 | 66 | −8 | 1.66 | 2.57 |
| | C13 | A13 | B6 | 180 | 69 | −7 | 1.68 | 2.48 |
| | C14 | A14 | B7 | 195 | 71 | −8 | 1.68 | 2.48 |
| Comparative exaxmple | c1 | a1 | b1 | 230 | 82 | 12 | 1.61 | 2.66 |
| | c2 | a2 | b2 | 234 | 89 | 12 | 1.61 | 2.65 |
| | c3 | a3 | b3 | 235 | 91 | 11 | 1.62 | 2.61 |
| | c4 | a4 | b4 | 238 | 82 | 9 | 1.62 | 2.63 |
| | c5 | a5 | b5 | 236 | 84 | 8 | 1.59 | 2.62 |
| | c6 | a6 | b6 | 238 | 90 | 9 | 1.58 | 2.61 |
| | c7 | a9 | b1 | 231 | 82 | 10 | 1.58 | 2.69 |
| | c8 | a10 | b2 | 235 | 85 | 8 | 1.58 | 2.71 |
| | c9 | a11 | b3 | 235 | 84 | 12 | 1.62 | 2.69 |
| | c10 | a12 | b4 | 238 | 86 | 11 | 1.61 | 2.63 |
| | c11 | A2 | b1 | 229 | 82 | 6 | 1.62 | 2.62 |
| | c12 | A4 | b2 | 234 | 81 | 8 | 1.62 | 2.63 |
| | c13 | A6 | b3 | 238 | 81 | 9 | 1.61 | 2.65 |
| | c14 | a1 | B1 | 205 | 75 | 8 | 1.64 | 2.59 |

TABLE 3-continued

| Symbol | Steel No. | Manufacturing method symbol | 1/2t position0048 Hardness $H_D$ of deformed structure (Hv) | Recrystallization ratio % | Hot-rolled sheet toughness Charpy test transition temperature (° C.) | Magnetic flux density B50 (T) | Iron loss W15/50 (W/kg) |
|---|---|---|---|---|---|---|---|
| c15 | a2 | B2 | 206 | 72 | −10 | 1.62 | 2.71 |
| c16 | A1 | b7 | 230 | 58 | −1 | 1.62 | 2.71 |
| c17 | A2 | b8 | 230 | 90 | 10 | 1.63 | 2.72 |

It was verified that, by using the hot-rolled steel sheet for non-oriented electrical steel sheets according to the present invention, fracture does not occur in the steel sheet during pickling and a non-oriented electrical steel sheet having excellent characteristics can be obtained as in a non-oriented electrical steel sheet formed of a hot-rolled steel sheet for non-oriented electrical steel sheets on which hot-rolled sheet annealing in the related art is performed.

Example 2

A hot-rolled steel sheet for non-oriented electrical steel sheets was prepared in the same manner as described above using the steel shown in Table 1 and the manufacturing method shown in Table 2. Using this hot-rolled steel sheet for non-oriented electrical steel sheets, a non-oriented electrical steel sheet was obtained.

Regarding the obtained hot-rolled steel sheet, in addition to the measurement result of Example 1, in the sheet width direction end portion of the hot-rolled steel sheet for non-oriented electrical steel sheets, the hardness difference $H_S=H_D—H_U$ between the hardness $H_D$ of the deformed structure of the thickness middle portion (½t position) and the hardness $H_U$ of the recrystallized structure of a thickness surface layer portion (⅛t position) was measured. In the non-oriented electrical steel sheet, magnetic characteristics were measured using the same method as that of Example 1. The results are shown in Table 4.

TABLE 4

| Symbol | Steel No. | Manufacturing method symbol | 1/2t position Hardness $H_D$ of deformed structure (Hv) | 1/8t position Hardness $H_U$ of recrystallized structure (Hv) | Hardness difference HS = HD − HU (Hv) | Hot-rolled sheet toughness Charpy test transition temperature (° C.) | Magnetic flux density B50 (T) | Iron loss W15/50 (W/kg) |
|---|---|---|---|---|---|---|---|---|
| D1 | A1 | B5 | 203 | 234 | 31 | −3 | 1.66 | 2.52 |
| D2 | A2 | B6 | 204 | 232 | 28 | −6 | 1.66 | 2.53 |
| D3 | A13 | B9 | 180 | 196 | 16 | −10 | 1.68 | 2.48 |
| D4 | A14 | B10 | 195 | 205 | 10 | −12 | 1.68 | 2.48 |

It was verified that, by adjusting the hardness difference $H_S$ between the hardness $H_D$ of the deformed structure of the thickness middle portion (½t position) and th'e hardness $H_U$ of the recrystallized structure of the thickness surface layer portion (⅛t position) to be less than HV 20, higher toughness can be obtained.

Example 3

In Example C1 and Comparative Example c16 shown in Table 3, the rolling reduction as a cold rolling condition was set as 75%, soaking conditions as final annealing conditions were set as 1000° C.×30 seconds, and cold rolling and final annealing were performed to obtain a non-oriented electrical steel sheet. Regarding each of the non-oriented electrical steel sheets, the hardness of the thickness middle portion (½t position) in the sheet width direction end portion was measured.

The hardness of the end portion of the non-oriented electrical steel sheet was measured in the following procedure. The cross section parallel to the rolling direction in the position (sheet width direction end portion) at a distance of 10 mm from the sheet width direction end surface of the steel sheet to the sheet width direction middle portion was set as a measurement surface. In this measurement surface, the hardness of the thickness middle portion (½t position) was measured at 10 positions at intervals of 10 in a direction parallel to the rolling direction. The Vickers hardness was measured as "HV 10" according to JIS Z 2244 (2009). Specific measurement conditions are as follows: Indenter=a Vickers square-based diamond pyramid indenter with a facing angle of 136°; Indentation load=10 gf; and Indentation time=20 sec. The measurement results are shown in Table 5.

TABLE 5

| Symbol | Steel No. | Manufacturing method symbol | 1/2t position hardness HD of deformed structure (Hot-rolled steel sheet) (HV) | Hardness at stage of non-oriented electrical steel sheet (HV) |
|---|---|---|---|---|
| C1 | A1 | B1 | 203 | 241 |
| c16 | A1 | b7 | 230 | 238 |

In C1 and c16, the chemical compositions were the same, and the hardness values at the stage of the non-oriented electrical steel sheet were substantially at the same level. However, the hardness values of the deformed structure at the stage of the hot-rolled steel sheet were largely different from each other. In other words, it is difficult to estimate the hardness at the stage of the hot-rolled steel sheet from the hardness measured at the stage of the non-oriented electrical steel sheet.

INDUSTRIAL APPLICABILITY

According to the present invention, it is possible to provide a hot-rolled steel sheet for non-oriented electrical steel sheets in which sufficient hot-rolled sheet toughness can be obtained even when annealing in a hot rolling process is skipped and low iron loss and high magnetic flux density can be achieved when a non-oriented electrical steel sheet is obtained from the hot-rolled steel sheet for non-oriented electrical steel sheets. As a result, a non-oriented electrical steel sheet having low iron loss and high magnetic flux density can be stably produced and provided without fracture. Therefore, urgent demand for mass production in the fields of electrical equipment where the non-oriented electrical steel sheet is used as an iron core material can be sufficiently satisfied, and the industrial value thereof is extremely high.

What is claimed is:

1. A hot-rolled steel sheet for non-oriented electrical steel sheets, the hot-rolled steel sheet comprising, by mass %:

C: 0.0010% to 0.0050%;
Si: 1.90% to 3.50%;
Al: 0.10% to 3.00%;
Mn: 0.05% to 2.00%;
P: 0.100% or less;
S: 0.005% or less;
N: 0.0040% or less;
B: 0.0060% or less;
Sn: 0% to 0.50%;
Sb: 0% to 0.50%;
Cu: 0% to 0.50%;
REM: 0% to 0.0400%;
Ca: 0% to 0.0400%;
Mg: 0% to 0.0400%; and
a remainder including Fe and impurities, wherein a hardness HD of a deformed structure is Hv 220 or less at a distance of 10 mm from a sheet width direction end surface of the hot-rolled steel sheet to a sheet width direction middle portion, which corresponds to a portion ½t from a surface of the hot-rolled steel sheet in a sheet thickness direction, where "t" is a thickness of the hot-rolled steel sheet; and wherein a hardness difference $H_S=H_D-H_U$ between the hardness $H_D$ of the deformed structure and a hardness $H_U$ of a recrystallized structure at a distance of 10 mm from a sheet width direction end surface of the hot-rolled steel sheet to a sheet width direction middle portion, which corresponds to a portion ⅛t from the surface of the hot-rolled steel sheet is less than Hv 20.

2. The hot-rolled steel sheet for non-oriented electrical steel sheets according to claim 1, further comprising, by mass %, one or more selected from: Sn: 0.01% or more and 0.50% or less; Sb: 0.01% or more and 0.50% or less; Cu: 0.01% or more and 0.50% or less; REM: 0.0005% or more and 0.0400% or less; Ca: 0.0005% or more and 0.0400% or less; and Mg: 0.0005% or more and 0.0400% or less.

* * * * *